March 13, 1951   F. P. BUNDY ET AL   2,545,340
METHOD OF MEASURING GAS PRESSURE IN FLAMES
Filed Feb. 15, 1950
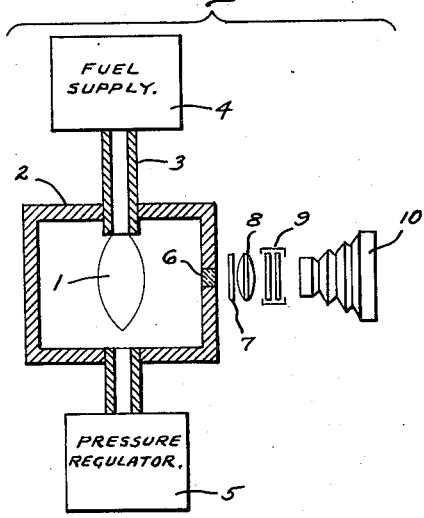
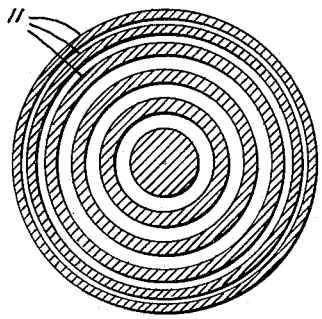
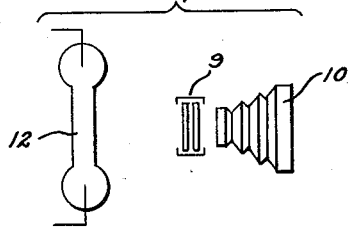
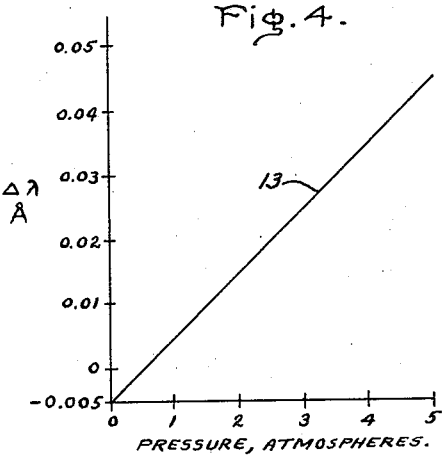
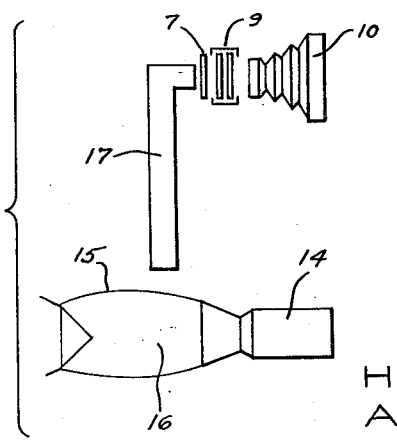
Inventors:
Francis P. Bundy,
Herbert M. Strong,
Arthur B. Gregg, Jr.,
by Paul A. Frank
Their Attorney.

Patented Mar. 13, 1951

2,545,340

UNITED STATES PATENT OFFICE 2,545,340

METHOD OF MEASURING GAS PRESSURE IN FLAMES

Francis P. Bundy, Alplaus, and Herbert M. Strong and Arthur B. Gregg, Jr., Schenectady, N. Y., assignors to General Electric Company, a corporation of New York Application February 15, 1950, Serial No. 144,316

1 Claim. (Cl. 88—14)

This invention relates to a method of measuring gas pressure within flames from wavelength changes in the emission spectrum of the flame.

In the development of rocket motors and the like, a method is needed for measuring gas pressure within the exhaust flame of the motor. Since the gases within such a flame may be at extremely high temperature, and may travel at supersonic speed, it is not feasible to measure the gas pressure by conventional methods. A probe inserted into the flame would be destroyed almost immediately by the high temperature, and, in addition, such a probe would disturb the gas flow and change the pressure which is to be measured.

An object of this invention is to provide improved optical means for measuring gas pressures within flames without inserting a probe into the flame. Other objects and advantages will appear as the description proceeds.

The features of this invention which are believed to be novel and patentable are pointed out in the claim which forms a part of this specification. For a better understanding of the invention, reference is made in the following description to the accompanying drawing, in which Fig. 1 is a schematic diagram of calibrating apparatus useful in practicing this invention; Fig. 2 is a representation of an interference pattern formed by such apparatus; Fig. 3 is a schematic diagram of another arrangement of calibrating apparatus; Fig. 4 is a graph of wavelength change versus pressure; and Fig. 5 is a schematic diagram of apparatus used in practicing this invention.

Referring now to Fig. 1, a calibration flame 1 may be provided within a pressure chamber 2. A fuel and oxygen mixture is supplied to flame 1 through pipe 3 from a suitable fuel supply 4. The pressure within chamber 2 is controlled by a pressure regulator 5. A transparent window 6, through which flame 1 may be observed, is provided at one end of chamber 2. The fuel mixture employed is such that the gases within flame 1 have substantially the same composition and are in substantially the same proportions as the gases of the flame within which pressure is to be measured. However, in contrast to the gases within the exhaust flame of a rocket motor, the gases within flame 1 travel at low velocity, so that the pressure within flame 1 is substantially the same as the pressure throughout chamber 2. This pressure is controlled at predetermined known values by pressure regulator 5.

This invention makes use of the small wavelength shift in the emission spectrum of a flame which occurs with pressure changes. As a reference for determining this wavelength shift, an observation is made of the wavelength of a resonance type spectral line in the emission spectrum of an element present in the flame. Since traces of sodium are naturally present in most rocket fuels, and if not present a trace of sodium can easily be added to the fuel, and since the spectral lines emitted by sodium are prominent and easily observed, use of the D spectral line as a wavelength reference is preferred in the practice of this invention.

Light emitted by the flame 1 passes through window 6 and through a filter 7. The filter transmits in substantial amounts only that light which is near in wavelength to the D spectral line. This eliminates much of the background light, and facilitates observation of the D line. The filtered light is focused by an optical system, represented in the drawing by lens 8, and passes through a Fabry-Perot interferometer 9. The interferometer produces an interference pattern which is photographed by camera 10. The Fabry-Perot interferometer is ideal for this work, since, although it is relatively small and rugged, it has an extremely high resolving power. High resolving power is essential, since the wavelength changes to be observed are quite small. A description of the Fabry-Perot interferometer may be found in the book by Tolansky, "High Resolution Spectroscopy," Methuen: London, 1945.

Fig. 2 represents an interference pattern formed by a Fabry-Perot interferometer. This interference pattern comprises a number of concentric annular interference fringes 11. In Fig 2, the shaded portions 11 represent the light portions of the actual interference pattern, which are the dark portions in the photographic negative made by camera 10. Each of the rings 11 represents a small portion of the spectrum, which is repeated in the other rings. The interferometer is adjusted so that each ring 11 corresponds to the D spectral line. A shift in wavelength of the D line produces a change in the radius of each ring 11 of the interference pattern. Thus, relative wavelengths of the D line in particular instances may be compared by comparing the radii of corresponding interference fringes in photographs of the respective interference patterns; provided that the interferometer adjustment is the same for all photographs compared.

Referring now to Fig. 3, a reference wavelength with which others may be compared can be obtained by photographing a standard light source, such as sodium vapor electric lamp 12, using interferometer 9 and camera 10. Calibration data of wavelength shift versus pressure is obtained by photographing a plurality of interference patterns of the light emitted by flame 1, Fig. 1, at a plurality of pressure values established by pressure regulator 5, and comparing these interference patterns with each other and preferably with the interference pattern produced from light emitted by lamp 12, Fig. 3. A calibration curve similar to Fig. 4 can then be made to show the relation between the shift in wavelength of the D line from an arbitrary reference value and the gas pressure within the flame.

In Fig. 4, the wavelength shift $\Delta\lambda$ in angstrom units is plotted as a function of the gas pressure in atmospheres. Curve 13 shows the relation obtained for a typical flame gas. It may be observed that curve 13 is a straight line. In general, the slope of this line is different for different gases, which is the reason why the gas mixture in calibration flame 1 should be substantially the same as the mixture in the flame within which temperature is to be measured. The reference wavelength, at $\Delta\lambda=0$, may conveniently be the wavelength of the D line in light emitted by standard lamp 12, or the reference wavelength may be corrected to the value corresponding to 0 atmospheres pressure by shifting curve 13 upward the required amount. Methods for calculating the differences in wavelength values from differences in interference fringe radii are known in the art. However, if the same interferometer adjusted in the same way is used throughout, calibration data may be in terms of changes in fringe radii versus pressure, and computation of actual wavelength changes is unnecessary.

Referring now to Fig. 5, a rocket motor 14 may be under test in a test pit, not shown. When operating, motor 14 produces the characteristic exhaust flame 15. Assume that it is desired to measure the gas pressure within region 16 of this flame. Light from region 16 is focused by a conventional optical system contained in periscope 17, and is transmitted to a location, outside the test pit, where the measurement apparatus is placed. Filter 7 removes the undesired background light by transmitting only that light which is near in wavelength to the D spectral line. Fabry-Perot interferometer 9 forms an interference pattern which is photographed by camera 10. Using the same interferometer 9, standard light source 12 is photographed as in Fig. 3. These two photographs are compared by measuring the radii of corresponding interference fringes to determine the wave-length shift of the D line in light emitted by the flame from the reference wavelength represented by the D line in light emitted by standard source 12. The difference in wavelength thus obtained may be compared with the calibration data, Fig. 4, to determine the gas pressure within region 16 of the flame.

Having described the principle of this invention and the best mode in which we have contemplated applying that principle, we wish it to be understood that the example described is illustrative only, and that other means may be employed without departing from the true scope of the invention.

What we claim as new and desire to secure by Letters Patent of the United States is:

The method of measuring gas pressure within flames, which comprises providing a calibration flame within a pressure chamber, said calibration flame having substantially the same constituents as the flame within which pressure is to be measured, passing light emitted by the calibration flame through a filter which transmits in substantial amounts only that light which is near in wavelength to a resonance spectral line of an element present in the flame, passing the filtered light through an interferometer to form an interference pattern comprising a plurality of interference fringes, varying the pressure within said pressure chamber, photographing said interference pattern at a plurality of pressure values within the chamber, measuring the relative positions of interference fringes in the photographs so made to obtain calibration data relating pressure values within said chamber to wavelength values of said spectral line, passing light emitted by the flame within which pressure is to be measured through a filter and an interferometer to form an interference pattern comprising a plurality of interference fringes of light having the same spectral line wavelength, photographing the last-mentioned interference pattern, passing light of the same spectral line wavelength emitted by a source of light of known wavelength through the same interferometer to form another interference pattern comprising a plurality of interference fringes, photographing the last-mentioned interference pattern, measuring the relative positions of interference fringes in the photograph of light from the flame within which pressure is to be measured with respect to the position of corresponding interference fringes in the photograph of light from the source of light of known wavelength to determine the wavelength difference between the corresponding spectral lines, such wavelength differences in combination with the calibration data being a measure of the pressure within the flame.

FRANCIS P. BUNDY.
HERBERT M. STRONG.
ARTHUR B. GREGG, Jr.

REFERENCES CITED

The following references are of record in the file of this patent:

UNITED STATES PATENTS

| Number | Name | Date |
|---|---|---|
| 1,044,502 | Crehore et al. | Nov. 19, 1912 |
| 2,256,804 | Hurley | Sept. 23, 1941 |
| 2,286,621 | Hurley | June 16, 1942 |
| 2,434,029 | Williams | Jan. 6, 1948 |

FOREIGN PATENTS

| Number | Country | Date |
|---|---|---|
| 386,315 | Great Britain | Jan. 12, 1933 |

OTHER REFERENCES

Harrison, Lord and Loofbourow—Practical Spectroscopy—Prentice-Hall, Inc.—New York, New York—1948—Pages 251 and 558 to 569.